US008601271B2

(12) United States Patent
Perez

(10) Patent No.: US 8,601,271 B2
(45) Date of Patent: Dec. 3, 2013

(54) METHOD AND SYSTEM FOR POWER MANAGEMENT USING ICMPV6 OPTIONS

(75) Inventor: Maria Perez, Half Moon Bay, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 64 days.

(21) Appl. No.: 13/248,929

(22) Filed: Sep. 29, 2011

(65) Prior Publication Data

US 2013/0086384 A1 Apr. 4, 2013

(51) Int. Cl.
*H04L 29/06* (2006.01)
(52) U.S. Cl.
USPC ............................................................ 713/175
(58) Field of Classification Search
USPC ............ 713/175, 176; 700/295; 726/22, 5, 10
See application file for complete search history.

(56) References Cited

U.S. PATENT DOCUMENTS

| 7,650,635 B2* | 1/2010 | Khare et al. ..................... 726/13 |
| 8,276,010 B2* | 9/2012 | Vavilala et al. ................. 713/320 |
| 2004/0203596 A1* | 10/2004 | Sreemanthula et al. ...... 455/411 |
| 2007/0036110 A1* | 2/2007 | Preguica ....................... 370/331 |

OTHER PUBLICATIONS

"Using Broadcom Advanced Control Suite 3: Broadcom Netxtreme 57XX User Guide" (note "Wake Up Capabilities"), Manuals, 39 pages; 2011.

* cited by examiner

*Primary Examiner* — Ali Abyaneh
(74) *Attorney, Agent, or Firm* — Buchanan Ingersoll & Rooney PC

(57) ABSTRACT

A method and system that facilitates power management over an IPv6 network connection is described. A first host having an application creates a power management option for managing power management settings of one or more second hosts, which is in network communication with the first host. A neighbor solicitation request is sent with the power management option to the one or more second hosts, wherein the power management option requests the power management settings of the one or more second hosts. A table of the power management settings for each of the one or more second hosts is generated from the responses received from the neighbor solicitation request, and the power management settings are applied to the one or more second hosts.

20 Claims, 3 Drawing Sheets

US 8,601,271 B2

METHOD AND SYSTEM FOR POWER MANAGEMENT USING ICMPV6 OPTIONS

FIELD OF THE INVENTION

The present invention relates to a method and system for power management, which is embedded in the ICMPv6 options of a networking device, and more particularly to a software module or software application associated with a computer device or host device such as an image forming apparatus, which uses ICMPv6 Options for power management of one or more devices on the network.

BACKGROUND OF THE INVENTION

Networks have enhanced our ability to communicate and access information by allowing one personal computer to communicate over a network (or network connection) with another personal computer and/or other networking devices, using electronic messages. When transferring an electronic message between personal computers or networking devices, the electronic message will often pass through a protocol stack that performs operations on the data within the electronic message (e.g., packetizing, routing, flow control).

Although, Internet Protocol Version 4 (IPv4) is still the dominant protocol of the Internet, its successor, Internet Protocol Version 6 (IPv6) is being deployed actively worldwide. The IPv6 network protocol provides that IPv6 hosts or host devices (e.g., image forming apparatuses and other devices) can configure themselves automatically (e.g., stateless address autoconfiguration) when connected to an IPv6 network using ICMPv6 neighbor discovery messages (e.g., Neighbor Discovery Protocol or NDP). When first connected to a network, an IPv6 host sends a link-local multicast neighbor solicitation request advertising its tentative link-local address for duplicate address detection (dad), and if no problem is encountered, the host uses the link-local address. The router solicitations are sent (or router advertisements are received depending on timing) to obtain network-layer configuration parameters, and routers respond to such a request with a router advertisement packet that contains network-layer configuration parameters.

With the implementation of IPv6 networks, it would be desirable to add additional power management options to a computer device and/or host device having IPv6 capabilities by including a software module or software application associated with the computer device and/or host device, and which uses ICMPv6 options for power management.

SUMMARY OF THE INVENTION

In consideration of the above issues, a software module or software application associated with a computer device or host device such as an image forming apparatus, which uses ICMPv6 Options for power management of one or more devices on the network is disclosed herein.

In accordance with an exemplary embodiment, a method that facilitates power management over an IPv6 network connection, the method comprises: initializing a first host on an IPv6 network connection, the first host having an application, which creates a power management option for managing power management settings of one or more second hosts, which is in network communication with the first host; sending a neighbor solicitation request with the power management option from the first host to the one or more second hosts, wherein the power management option requests the power management settings of the one or more second hosts; receiving the neighbor solicitation request on the one or more second hosts, each of the one or more second hosts having an application for processing the neighbor solicitation request with the power management option; sending a neighbor advertisement to the first host with a response to the request for power management settings; receiving the neighbor advertisement from the second host on the first host and validating the power management settings of the one or more second hosts; generating a table of the power management settings for each of the one or more second hosts; and applying the power management settings to the one or more second hosts per the power management settings stored in the table of the power management settings for each of the one or more second hosts.

In accordance with another exemplary embodiment, a system that facilitates power management over an IPv6 network connection for a first host and one or more second hosts, the system comprises: a first host on an IPv6 network connection, the first host having an application, which creates a power management option for managing power management settings of one or more second hosts, which are in network communication with the first host; the first host configured to: send a neighbor solicitation request with the power management option to the one or more second hosts, wherein the power management option requests the power management settings of the one or more second hosts; receive a neighbor advertisement from the second host on the first host and validate the power management settings of the one or more second hosts; generate a table of the power management settings for each of the one or more second hosts; and apply the power management settings to the one or more second hosts per the power management settings stored in the table of the power management settings for each of the one or more second host.

In accordance with a further exemplary embodiment, a computer program product comprising a non-transitory computer usable medium having a computer readable code embodied therein for a first host and one or more second hosts, the first host having an application, which creates a power management option for managing power management settings of one or more second hosts, which are in network communication with the first host, the computer readable code configured to execute a process for a software module that that facilitates power management over an IPv6 network connection, the process comprises: sending a neighbor solicitation request with a power management option from the first host to the one or more second hosts, wherein the power management option requests the power management settings of the one or more second hosts; receiving a neighbor advertisement from the one or more second hosts and validating the power management settings of the one or more second hosts; generating a table of the power management settings for each of the one or more second hosts; and applying the power management settings to the one or more second hosts per the power management settings stored in the table of the power management settings for each of the one or more second host.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
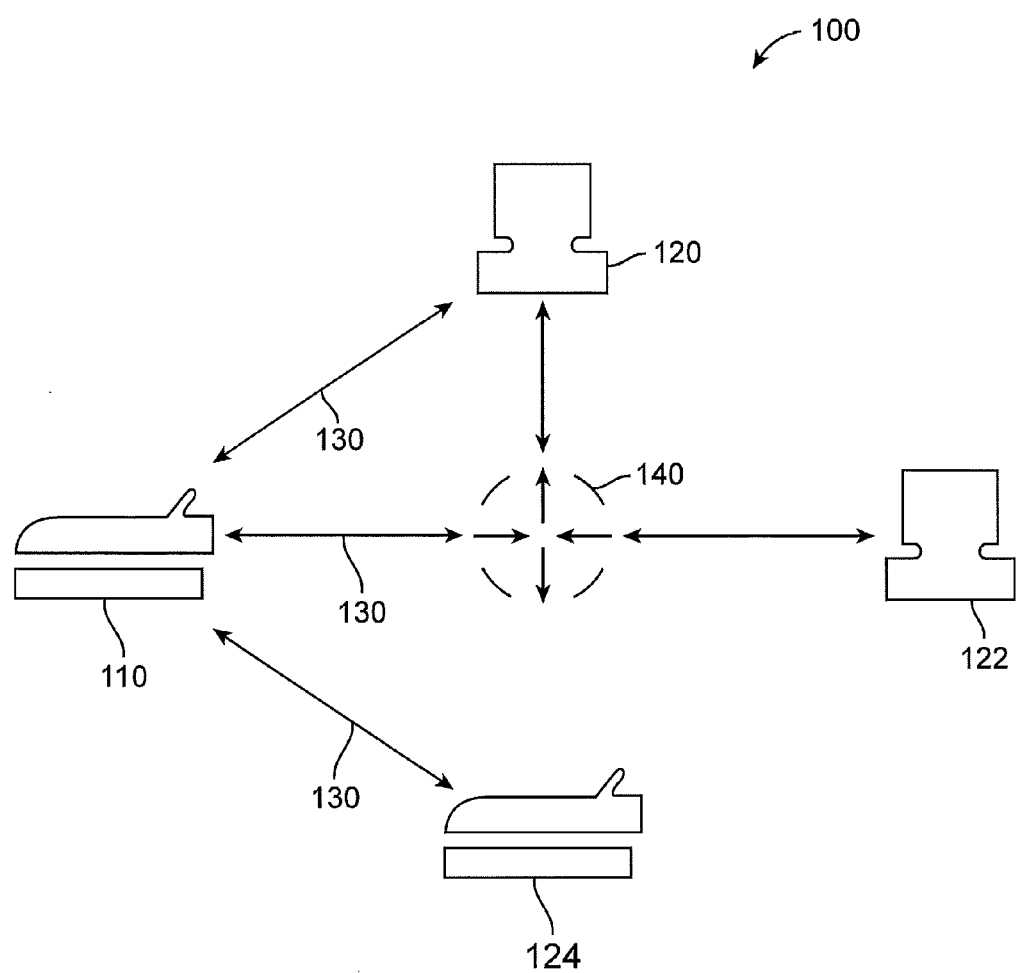
FIG. 1 is an illustration of a network system with a network communication protocol in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 shows a network system 100 with a network communication in accordance with an exemplary embodiment, which includes a host device 110 in the form of an image forming apparatus or multi-functional device. As shown in FIG. 1, the network system 100 is composed of a host device 110 and one or more second hosts or client devices 120, 122, 124. The host device 110 and the one or more second hosts 120, 122, 124 are connected to each other through an IPv6 communication network 130 in a state capable of performing data communications. in accordance with an exemplary embodiment, the hosts 110, 120, 122, 124 can be any network device or networking device, which supports an IPv6 communication protocol (Internet Protocol version 6). Examples of communication networks 130 consistent with embodiments of the invention include, but are not limited to, the Internet, an Intranet, a local area network (LAN) and a wide area network (WAN). The host device 110 and the one or more second hosts 120, 122, 124 can be connected with a wire or can be connected with a wireless connection by using radio frequency (RF), infrared (IR) transmission, USB, IEEE1394 and/or other suitable wireless technology.

In accordance with an exemplary embodiment, the host device 110 may be embodied by a printer, a Multi-Function Peripheral (MFP) and other known image forming apparatuses, which prints an image on a printing medium (or a recording medium) such as a sheet of paper. The image (or print job) is based on printing data generated by the one or more second hosts 120, 122, and 124. In accordance with an exemplary embodiment, the host device 110 is a Multi-Function Peripheral (MFP), which includes at least a copy function, an image reading function, and a printer function, and forms an image on a sheet based on a print job (print instruction) sent from the one or more second hosts 120, 122, 124, image data read by an image reading section, such as a scanner, provided in the host device 110, or the like.

In accordance with an embodiment, the one or more second hosts 120, 122, 124, which may be embodied by a computer system, and generates the printing data usable in the host device 110 and transmits the generated printing data to the host device 110. An example of the one or more second hosts 120, 122, 124 may include an image forming apparatus, a personal computer, a portable device such as a notebook personal computer, a cellular phone, a personal digital assistant (PDA), a router, an intermediary device and/or server and like devices and/or systems, which send data over a communication network. For example, the host device 110 and the one or more second hosts 120, 122, 124 can constitute a plurality of image forming devices or systems, which includes a communication port, to generate printing data, and to perform a printing operation of forming an image on a printing medium according to the printing data. The system 100 can also include one or more routers, switches, bridges, and other networking equipment 140 that forward data packets within the system 100.

In accordance with another exemplary embodiment, the one or more second hosts 120, 122, 124 can be a plurality of personal computers having the function of sending a print job to the first host device 110 in the form of an image forming apparatus. A printer driver program (hereinafter, sometimes simply referred to as a printer driver) is installed in the second host 120, 122, 124, and the one or more second hosts 120, 122, 124 use the function of the printer driver to generate a print job including the data of print conditions to be applied at the time of image formation, image data, and the like, and to send the generated print job to the first host device 110 in the form of an image forming apparatus.

In the IPv6 protocol, the generation of an IP address (or IPv6 address) for an image forming device or other device is defined in RFC 2462, entitled "IPv6 Stateless Address Autoconfiguration." The IPv6 stateless autoconfiguration utilizes several features in IPv6, including link-local addresses, multicasting, the Neighbor Discovery (ND) protocol, and the ability to generate the interface identifier of an address from an underlying data link layer address (or MAC ID). The IPv6 protocol provides a host device 110, 120, 122, 124, the ability to generate a temporary address until it can determine the characteristics of the network it is on, and then create a permanent address it can use based on that information.

In accordance with an exemplary embodiment, a host device or image forming apparatus generates a link-local address, which has "1111 1110 10" for the first ten bits, followed by 54 zeroes and then the 64-bit interface identifier, which will typically be derived from the data link layer (MAC) address. The host device 110 then performs an Address Uniqueness Test (or duplicate address detection (DAD)) to determine and ensure that the generated address is not for some reason already in use on the local network. The host device 110 sends a Neighbor Solicitation message using the Neighbor Discovery Protocol (NDP), and listens for a Neighbor Advertisement in response that indicates that another device is already using its link-local address; if so, either a new address must be generated, or autoconfiguration fails and another method must be employed.

Assuming the link-local address (e.g., message) passes the uniqueness test (or DAD), the host device 110 assigns the link-local address (e.g., Link-Local Address Assignment) to its IP interface. This address can be used for communication on the local network, however, it cannot be used on the wider Internet (or communication network) since link-local addresses are not routed.

The host device 110 then attempts to contact a local router for more information on continuing the configuration of the host device 110. This is done either by listening for Router Advertisement messages sent periodically by routers, or by sending a specific Router Solicitation to ask a router for information on what to do next. The router also provides direction to the node on how to proceed with the autoconfiguration. The router can tell the node that on this network "stateful" autoconfiguration is in use, and tell it the address of a DHCP server to use. Alternately, the router will tell the host how to determine its global Internet address.

Assuming that stateless autoconfiguration is in use on the network, the host device 110 will configure itself with its globally-unique Internet address after performing double address detection. This globally-unique address is generally formed from a network prefix provided to the host by the router, combined with the device's identifier as generated in the first step. In addition, when using the protocol stateless addressing (stateless autoconfiguration) for IPv6, which is required by the IPv6 Ready Logo Program, the link-local addresses and global addresses are determined by concatenating an identifier unique to the adapter. Thus, when a MAC address broadcast is sent out, each network interface card on the local area network will see the broadcast address and automatically pass the information up to the upper layers of the OSI model (Open Systems Interconnection model).

The Neighbor Discovery Protocol (NDP) is a protocol in the Internet Protocol Suite used with Internet Protocol Version 6 (IPv6). NDP operates in the Link Layer of the Internet model and is responsible for address autoconfiguration of nodes, discovery of other nodes on the link, determining the Link Layer addresses of other nodes, duplicate address detection, finding available routers and Domain Name System (DNS) servers, address prefix discovery, and maintaining reachability information about the paths to other active neighbor nodes and/or hosts. The protocol defines five different ICMPv6 packet types, which perform functions for IPv6 similar to the Address Resolution Protocol (ARP) and Internet Control Message Protocol (ICMP) Router Discovery and Router Redirect protocols for IPv4. The different ICMPv6 packet types include Router Solicitation, Router Advertisement, Neighbor Solicitation, Neighbor Advertisement, and Redirect Message.

Figure 2:
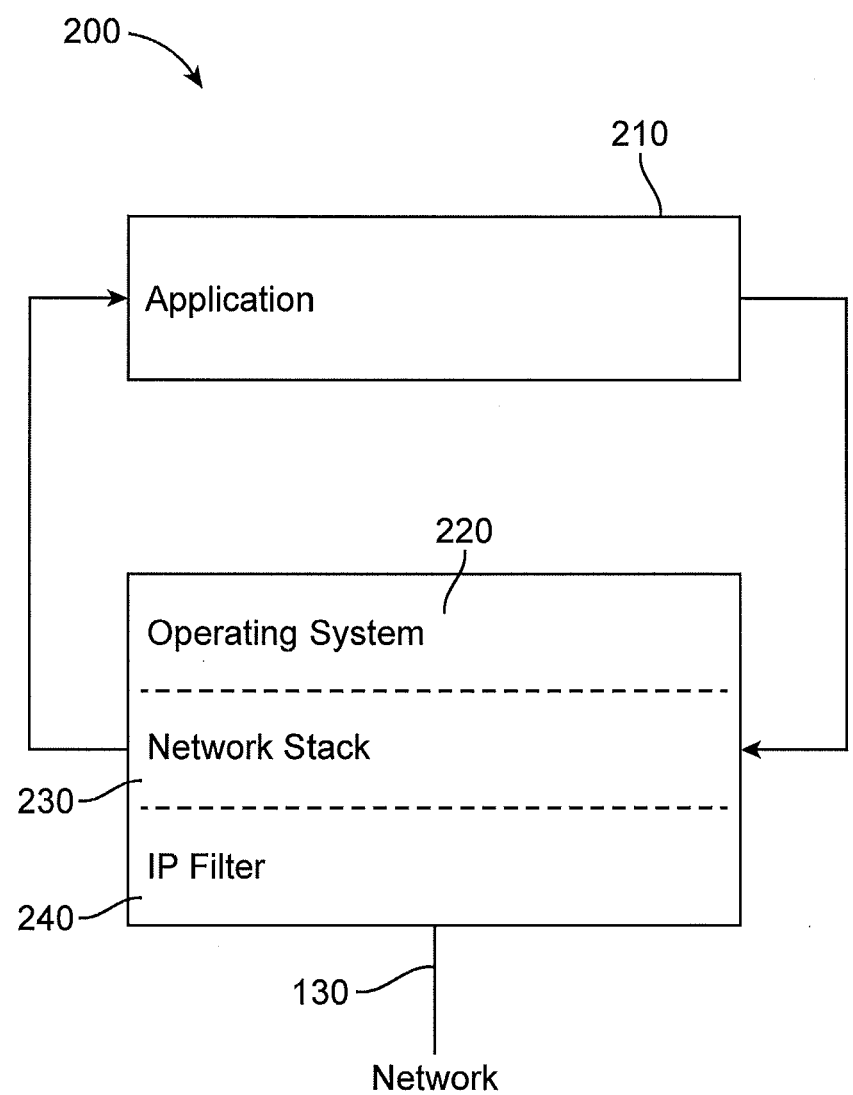
FIG. 2 is an illustration of a network stack having an application for filtering data packets in accordance with another exemplary embodiment.

FIG. 2 is an illustration of a network stack for a host device (or node) 200 having an application 210 for filtering data packets in accordance with an exemplary embodiment. As shown in FIG. 2, the host device 200 has an application or software module 210 and an IP filter (or packet capture filter) 240, which captures (or intercepts) outgoing and incoming data packets having neighbor solicitation and/or neighbor advertisement requests pursuant to the IPv6 protocol. As shown in FIG. 2, the application or software module 210 is preferably an application level module, which is configured to modify, drop, change, and judge Neighbor Discovery Protocol generated packages (e.g., neighbor solicitation or neighbor advertisement packets) as described herein. In accordance with an exemplary embodiment, the application or software module 210 can be part of the printer driver and/or firmware of a host device, such as a personal computer and/or multifunctional printer, a separate software module or application, or part to the operating system of the host device.

In accordance with an exemplary embodiment, the IP filter 240 forwards the incoming or outgoing packet having a neighbor solicitation or neighbor advertisement packet (or package) to the software module 210, which in combination with the socket layer modifies, changes, drops and/or judges the neighbor discovery generated packages as described herein. Each of the host devices 200 preferably includes an application or software module 210, which can perform at least a portion and/or more preferably all of the steps necessary to set and/or decrypt the power management options and/or security options as described herein.

The packets (or packages) are preferably broadcast and/or sent out via a communication network (e.g., IPv6 network) 130. In accordance with an exemplary embodiment, the IP filter 240 preferably captures the IPv6 packet before the initial broadcast (e.g., neighbor discovery) and/or alternatively, before the packet is sent to the Network Stack 230 for processing. In accordance with an exemplary embodiment, the software module's 210 functionality also can be enabled or disabled at will by a network administrator or other designated individual.

The host device 200 includes an operating system 220 (OS), which acts as an interface between the device's hardware and application programs, and which is also responsible for the management and coordination of activities and the sharing of the resources within host devices. In accordance with an exemplary embodiment, the software module 210 runs on the operating system 220 of the computer device (or node), and the network layer is under or a part of the operating system 220. By utilizing an application or software module 210 as described herein, the operating system of the host device 200 does not need to be altered or changed in anyway.

Alternatively, in accordance with another exemplary embodiment, the operating system (OS) 220 can be configured to perform the methods as described herein. The examples as set forth herein are exemplary only, and as such, additional power management and/or security options, which use IPv6 Neighbor Discovery messages can be implemented without departing from the present invention.

In accordance with an exemplary embodiment, the host device (or first host) 200 upon initializing its connection over an IPv6 network connection has application 210, which creates a power management option for managing power management settings of one or more second hosts, which is in network communication with the first host 200. The application sends a neighbor solicitation request with the power management option to the one or more second hosts, wherein the power management option requests the power management settings of the one or more second hosts. Each of the one or more second hosts receives the neighbor solicitation request and has an application for processing the neighbor solicitation request with the power management option. Each of the second hosts sends a neighbor advertisement to the first host with a response to the request for power management settings. The first host receives the neighbor advertisement from the one or more second hosts and validates the power management settings of the one or more second hosts. The application associated with the first hosts generates a table of the power management settings for each of the one or more second hosts. The application 210 applies the power management settings to the one or more second hosts per the power management settings received from each of the one or more second hosts.

In accordance with an exemplary embodiment, the power management options sent by the first host during initialization are encrypted and embedded in the in ICMPv6 options of the packet. The neighbor solicitation request is preferably a neighbor discovery message, which is sent to obtain IPv6 network information from the one or more second hosts. In accordance with an exemplary embodiment, security options can also be sent with the power management options. The neighbor solicitation request for power management information includes a public certificate and a private key. The application or software module on the second host preferably validates the public certificate and decrypts the private key. If the application is able to decrypt the digital certificate and the first encrypted job identifier, stripping the neighbor solicitation request of the at least one security option and creating a new checksum and accepting the neighbor solicitation request from the first host. In addition, the neighbor advertisement includes a public certificate, and wherein the application on the first host decrypts the public certificate to obtain the power management settings for the one or more second hosts.

In accordance with another exemplary embodiment, the neighbor solicitation request and the neighbor advertisement are filtered with an IP filter associated with each of the hosts. The IP filter directs the neighbor solicitation request and the neighbor advertisement to the software application associated with each of the hosts. The neighbor solicitation request is Neighbor Discovery request and the neighbor advertisement is a Neighbor Advertisement pursuant to an IPv6 protocol.

For example, during the first host IPv6 initialization double address detection or duplicate address detection process (DAD), the ICMPv6 messages send will contain an extra option with a public certificate. Afterwards, Neighbor Discovery multicast solicitations can be sent with power management options encrypted with a private key. Each of the one or more second hosts has an application which will strip, decrypt and validate the package options. The options will inquire power management information from each of the one or more second hosts. Each of the one or more second hosts will send neighbor advertisement messages and power management options encrypted with the certificate. The first host will strip, decrypt and validate the power management options. The first host creates a table of the power management options for each of the one or more second hosts.

In accordance with an exemplary embodiment, the power management settings for each of the one or more second hosts are applied according to priority of hosts or host devices and/or a feasibility of performing the requested power management functions per each of the one or more second hosts. For example, the power management settings sent from a default router of DCHPv6 server will have priority or precedence over any preferences (e.g., power management settings) from any of the one or more second hosts devices, which are image forming apparatuses and the like. The application 210 on the first host will apply the power management settings according to the priority and feasibility. For example, the power management settings for each of the one or more second hosts can include standby, sleep, hibernation, and shut down and/or shut-off, which can be implemented without regard to current settings and/or alternatively, based on conditions, such as pending print jobs, etc. In accordance with an exemplary embodiment, the power management settings can be checked according to the neighbor discovery timing rules, and the table can be refreshed as needed.

In accordance with an exemplary embodiment, the power management settings can include statuses such as sleep or standby, hibernation, and/or shut down. For example, sleep or standby is a setting wherein the operating system (OS) call and/or program execution of a host device suspends the execution of a program for specified period of time and/or is an inactive state for a period of time. Alternatively, hibernation is a feature of many host device and/or computer operating systems where the contents of RAM are written to non-volatile storage such as a hard disk, as a file or on a separate partition, before powering off the device and/or computer. When the host device is restarted it reloads the content of memory and is restored to the state it was in when hibernation was invoked. Hibernation is used as an alternative to powering down the computer, because hibernating and later restarting is usually faster than closing down, later starting up, and starting all the programs that were running. Furthermore, going into hibernation requires no user interaction. Hibernation serves a similar purpose as Sleep mode. It offers greater power savings in exchange for a slower resume. Shut down or power off request a host device such as a computer to remove power from a computer's main components in a controlled way. After a host device or computer is shut down, main components such as CPUs, RAM modules and hard disk drives are powered down, although some internal components, such as internal clock, may retain power.

Figure 3:
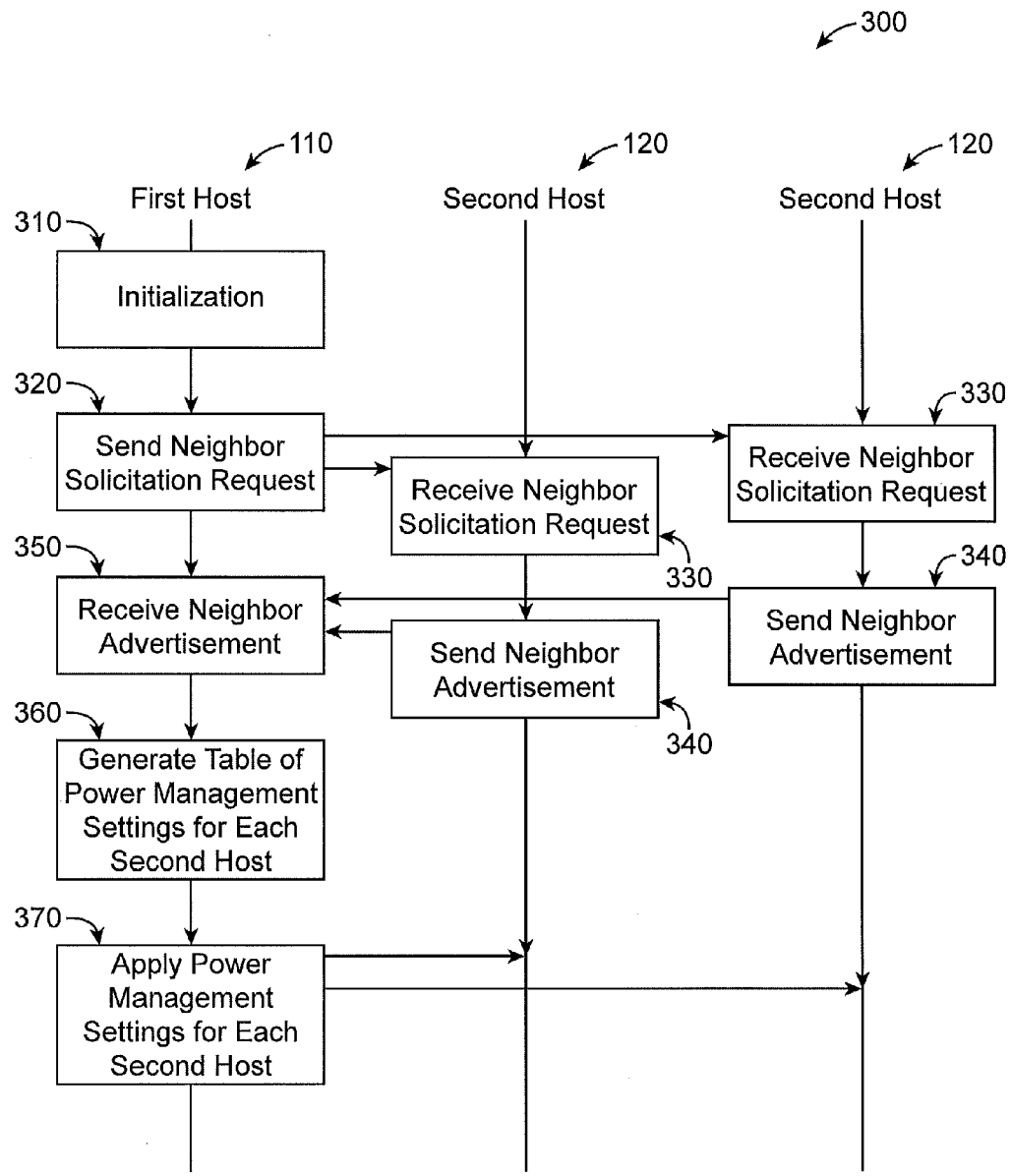
FIG. 3 is a flow chart of a system that facilitates power management over an IPv6 network connection in accordance with an exemplary embodiment.

FIG. 3 is a flow chart of a system 300 that facilitates power management over an IPv6 network connection. The system 300 includes a first host 110 and one or more second hosts 120, which are connected to each other through an IPv6 communication network 130 in a state capable of performing data communications. As shown in FIG. 3, in step 310, the first host 110 is initialized on an IPv6 network connection 130, the first host 110 having an application 210, which creates a power management option for managing power management settings of one or more second hosts 120, which is in network communication with the first host 110. In step 320, a neighbor solicitation request is sent from the first host 110 with the power management option to the one or more second hosts 120, wherein the power management option requests the power management settings of the one or more second hosts 120. In step 330, the one or more second hosts 120 receive the neighbor solicitation request, each of the one or more second hosts 120 having an application for processing the neighbor solicitation request with the power management option. In step 340, a neighbor advertisement is sent to the first host 110 with a response to the request for power management settings. In step 350, the neighbor advertisement is received from the second host 120 on the first host 110 and the power management settings of the one or more second hosts 120 are validated. In step 360, a table of the power management settings for each of the one or more second hosts 120 is generated. In step 370, the power management settings are applied to the one or more second hosts 120 per the power management settings stored in the table of the power management settings for each of the one or more second hosts 120.

In accordance with another exemplary embodiment, a computer program product, which includes a non-transitory computer usable medium having a computer readable code embodied therein for a first host and one or more second hosts. The computer readable code configured to cause the first and one or more second hosts to execute a process for a software module that that facilitates power management over an IPv6 network connection, the process comprising: initializing a first host on an IPv6 network connection, the first host having an application, which creates a power management option for managing power management settings of one or more second hosts, which is in network communication with the first host; sending a neighbor solicitation request with the power management option to the one or more second hosts, wherein the power management option requests the power management settings of the one or more second hosts; receiving the neighbor solicitation request on the one or more second hosts, each of the one or more second hosts having an application for processing the neighbor solicitation request with the power management option; sending a neighbor advertisement to the first host with a response to the request for power management settings; receiving the neighbor advertisement from the second host on the first host and validating the power management settings of the one or more second hosts; generating a table of the power management settings for each of the one or more second hosts; and applying the power management settings to the one or more second hosts per the power management settings stored in the table of the power management settings for each of the one or more second hosts.

The non-transitory computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method that facilitates power management over an IPv6 network connection, the method comprising:
    initializing a first host on an IPv6 network connection, the first host having an application, which creates a power management option for managing power management settings of one or more second hosts, which is in network communication with the first host;
    sending a neighbor solicitation request with the power management option from the first host to the one or more second hosts, wherein the power management option requests the power management settings of the one or more second hosts, each of the one or more second hosts having one or more power management settings;
    receiving the neighbor solicitation request on the one or more second hosts, each of the one or more second hosts having an application for processing the neighbor solicitation request with the power management option and wherein the neighbor solicitation request includes a public certificate and a private key, and wherein the application on the one or more second hosts validates the public certificate and decrypts the private key;
    sending a neighbor advertisement to the first host with a response to the request for power management settings;
    receiving the neighbor advertisement from the one or more second hosts on the first host, and wherein the neighbor advertisement includes a public certificate, and the application on the first host validates and decrypts the public certificate to obtain the power management settings for the one or more second hosts, and wherein the power management settings for each of the one or more second hosts include sleep, hibernation, turn off and/or standby;
    generating a table of the power management settings for each of the one or more second hosts; and
    applying the power management settings to the one or more second hosts per the power management settings stored in the table of the power management settings for each of the one or more second hosts.

2. The method of claim 1, wherein the power management settings for each of the one or more second hosts are applied according to priority of the one or more second hosts and/or a feasibility of the one or more second hosts requested power management setting.

3. The method of claim 1, further comprising updating the table of power management settings for each of the one or more second hosts using neighbor discovery timing rules.

4. The method of claim 1, wherein the table of power management setting has an address for each of the one or more second hosts.

5. The method of claim 1, further comprising encrypting and embedding the power management options in ICMPv6 options sent by the first host during initialization.

6. The method of claim 1, wherein the neighbor solicitation request is a neighbor discovery message, which is sent to obtain IPv6 network information from the one or more second hosts.

7. The method of claim 1, further comprising filtering the neighbor solicitation request and the neighbor advertisement with an IP filter associated with each of the hosts.

8. The method of claim 7, wherein the IP filter directs the neighbor solicitation request and the neighbor advertisement to the software application associated with each of the hosts.

9. The method of claim 1, wherein if the application on the one or more second hosts is able to decrypt the public certificate and a first encrypted job identifier, stripping the neighbor solicitation request of at least one security option and creating a new checksum and accepting the neighbor solicitation request from the first node.

10. The method of claim 1, wherein the neighbor solicitation request is Neighbor Discovery request and the neighbor advertisement is a Neighbor Advertisement pursuant to an IPv6 protocol.

11. The method of claim 1, wherein the first host is an image forming apparatus, a computer and/or a host device, and the one or more second hosts is an image forming apparatus, an intermediary device, a router, and/or a personal computer.

12. A system that facilitates power management over an IPv6 network connection for a first host device and one or more second host devices, the system comprising:
    a first host device on an IPv6 network connection, the first host device having an application, which creates a power management option for managing power management settings of one or more second host devices, which are in network communication with the first host device; the first host device configured to:
    send a neighbor solicitation request with the power management option to the one or more second host devices, wherein the neighbor solicitation request includes a public certificate and a private key, and wherein an application on the one or more second host devices validates the public certificate and decrypts the private key, and the power management option requests the power management settings of the one or more second hosts, each of the one or more second host devices having one or more power management settings;
    receive a neighbor advertisement from the one or more second host devices on the first host device, wherein the neighbor advertisement includes a public certificate, and the application on the first host device validates and decrypts the public certificate to obtain the power management settings for the one or more second host devices, and wherein the power management settings for each of the one or more second host devices include sleep, hibernation, turn off and/or standby;
    generate a table of the power management settings for each of the one or more second host devices; and
    apply the power management settings to the one or more second host devices per the power management settings stored in the table of the power management settings for each of the one or more second host devices.

13. The system of claim 12, further comprising the one or more second host devices having the application configured to:
    receive the neighbor solicitation request on the one or more second host devices, each of the one or more second host devices having the application for processing the neighbor solicitation request with the power management option; and send the neighbor advertisement to the first host device with a response to the request for power management settings.

14. The system of claim 12, wherein the table of power management settings for each of the one or more second host devices is updated using neighbor discovery timing rules.

15. The system of claim 12, wherein the table of power management setting has an address for each of the one or more second host devices.

16. The system of claim 12, wherein the first host device encrypts and embeds the power management options in ICMPv6 options sent by the first host device during initialization, and wherein the neighbor solicitation request is a neighbor discovery message, which is sent to obtain IPv6 network information from the one or more second host devices.

17. A computer program product comprising a nontransitory computer usable medium having a computer readable code embodied therein for a first host and one or more second hosts, the first host having an application, which creates a power management option for managing power management settings of one or more second hosts, which are in network communication with the first host, the computer readable code configured to execute a process for a software module that facilitates power management over an IPv6 network connection, the process comprising:

sending a neighbor solicitation request with the power management option from the first host to the one or more second hosts, wherein the neighbor solicitation request includes a public certificate and a private key, and wherein an application on the one or more second host validates the public certificate and decrypts the private key, and the power management option requests the power management settings of the one or more second hosts, each of the one or more second hosts having one or more power management settings;

receiving a neighbor advertisement from the one or more second host on the first host, and wherein the neighbor advertisement includes a public certificate, and the application on the first host validates and decrypts the public certificate to obtain the power management settings for the one or more second hosts, and wherein the power management settings for each of the one or more second hosts include sleep, hibernation, turn off and/or standby;

generating a table of the power management settings for each of the one or more second hosts; and applying the power management settings to the one or more second hosts per the power management settings stored in the table of the power management settings for each of the one or more second host.

18. The computer program product of claim 17, further comprising the one or more second hosts having the application configured to:

receive the neighbor solicitation request on the one or more second hosts, each of the one or more second hosts having the application for processing the neighbor solicitation request with the power management option; and send a neighbor advertisement to the first host with a response to the request for power management settings.

19. The computer program product of claim 17, further comprising updating the table of power management settings for each of the one or more second hosts using neighbor discovery timing rules.

20. The computer program product of claim 17, wherein the table of power management setting has an address for each of the one or more second hosts.

* * * * *